United States Patent [19]

Chae et al.

[11] Patent Number: 5,227,932
[45] Date of Patent: Jul. 13, 1993

[54] TAPE CONVEYING DEVICE FOR VIDEO CASSETTE RECORDER

[75] Inventors: You S. Chae; Myung C. Baek, both of Kyungki, Rep. of Korea

[73] Assignee: Goldstar Co., Ltd., Seoul, Rep. of Korea

[21] Appl. No.: 767,907

[22] Filed: Sep. 30, 1991

[30] Foreign Application Priority Data

Sep. 29, 1990 [KR] Rep. of Korea ............... 15611/1990

[51] Int. Cl.⁵ .......................................... G11B 15/665
[52] U.S. Cl. ........................................ 360/85; 360/95
[58] Field of Search ....................... 360/85, 95, 96.1

[56] References Cited

U.S. PATENT DOCUMENTS

| | | | |
|---|---|---|---|
| 4,410,919 | 10/1983 | Umeda | 360/85 |
| 4,459,625 | 7/1984 | Kawase | 360/85 |
| 5,115,361 | 5/1992 | Teragama et al. | 360/85 |

*Primary Examiner*—Paul M. Dzierzynski
*Assistant Examiner*—Richard Hanig

[57] ABSTRACT

A tape conveying device of a VCR comprising a supply slant base, a first take-up slant base and a second take-up slant base which are adapted to travel along a supply guide groove, a first take-up guide groove and a second take-up guide groove, respectively. The supply guide groove and the second take-up guide groove are formed in the horizontal chassis surface. The first take-up guide groove has an unloading portion formed in the horizontal chassis surface and a curvedly extending loading portion formed in a downwardly inclined chassis surface extending from the horizontal chassis surface rearwardly of the drum. Respective end portions of the first and second take-up guide grooves corresponding to loading positions of the first and second take-up slant bases extend laterally so that the first and second take-up slant bases extend laterally at their loading positions, respectively. As a result, the space occupied by the take-up slant bases at the rear of drum can be minimized.

6 Claims, 5 Drawing Sheets

TAPE CONVEYING DEVICE FOR VIDEO CASSETTE RECORDER

BACKGROUND OF THE INVENTION

The present invention relates to a tape conveying device for a video cassette recorder, and more particularly to a tape conveying device for a video cassette recorder which is capable of minimizing the tape travel load and reducing the occupying space at the rear of a drum and thus the size of a deck mechanism, thereby enabling the VCR to be compact and light.

In conventional helical scanning-type VCRs, the winding angle of tape around drum is about 180°. According to the recent trend of the compactness and lightness of VCRs, there have been proposed drums of small size having the diameter corresponding to about ⅔ of those of conventional drums and the tape winding angle of about 270°.

Referring to FIG. 1, there is shown an example of VCRs equipped with such small drums. In this case, a tape 2 which is supplied from a supply reel 25 of a tape cassette 1 to the tape inlet of a drum 9, via a tension post member 3, an impedance roller 4, a supply guide roller 7 and a supply slant post 8 advances in parallel to a chassis, that is horizontally. On the other hand, the tape 2 which comes out of the tape outlet of drum 9 passes a take-up slant post 15 and a take-up guide roller 10 and advances downwardly and inclinedly with respect to the horizontal chassis surface. This is because the tape winding angle of drum is as large as about 270°. Then, the tape 2 travels in parallel to the horizontal chassis surface, by a middle slant post 62 and returns to a take-up reel 26, via a capstan shaft 16 contacting a pinch roller 17 and a guide member 18.

Otherwise, the tape being supplied to the tape inlet of drum may travel upwardly and inclinedly with respect to the horizontal chassis surface. In this case, the tape coming out of the outlet of drum and passing the take-up slant post 15 advances in parallel to the horizontal chassis surface. Of course, the middle slant post 62 is disposed near the inlet of drum 9.

Also, the travel direction of the tape may not be parallel to the horizontal chassis surface at both inlet and outlet of drum.

In conventional tape conveying devices to which the above-mentioned tape travel systems are applied, the use of slant posts and the tape contact angle of slant posts are inevitably increased, thereby causing the tape travel load to increase. Since a slant post and a guide roller are disposed at the rear of drum, they occupy considerably the rear space of drum. As a result, the total size of deck mechanism is increased.

SUMMARY OF THE INVENTION

Therefore, an object of the invention is to overcome the above-mentioned disadvantages encountered in the prior art and to provide a tape conveying device of a VCR which is capable of reducing a tape travel load, so as to provide stability and reliability.

Another object of the invention is to provide a tape conveying device of a VCR which has a compact and light construction.

In accordance with the present invention, these objects can be accomplished by providing a tape conveying device of a VCR which comprises a supply loading gear and a take-up loading gear rotatably mounted to rotatable shafts protruded downwardly from a chassis of the VCR, so as to feed a tape of a tape cassette via a drum, said gears being engaged with each other, said device further comprising: a supply slant base adapted to travel along a supply guide groove formed at said chassis to guide and supply the tape to said drum and provided at its lower surface with a guide pin protruded downwardly into said supply guide groove and at its upper surface with a supply guide roller protruded vertically and upwardly and a supply slant post protruded upwardly and inclinedly with respect to said upper surface; a supply loading mechanism connected operatively to said supply loading gear and adapted to move said supply slant base between its tape unloading position and its tape loading position, according to the rotation of supply loading gear; a first take-up slant base adapted to travel along a first take-up guide groove formed at said chassis to guide the tape coming out of the drum and provided at its lower surface with a guide pin protruded downwardly into said first take-up guide groove and at its upper surface with a first take-up guide roller protruded vertically and upwardly; a second take-up slant base adapted to travel along a second take-up guide groove formed at said chassis to guide the tape passing said first take-up guide roller of first take-up slant base and provided at its lower surface with a guide pin protruded downwardly into said second take-up guide groove and at its upper surface and a supply slant post protruded upwardly and inclinedly with respect to said upper surface; and a take-up loading mechanism connected operatively to said take-up loading gear and adapted to move said first and second take-up slant bases between their tape unloading positions and their tape loading positions, according to the rotation of take-up loading gear.

BRIEF DESCRIPTION OF THE DRAWINGS

Other object and aspects of the invention will become apparent from the following description of embodiments with reference to the accompanying drawings in which:

FIG. 5 is a partial sectional view of the tape conveying device in accordance with the embodiment of the present invention, in which FIG. 5A shows partially a take-up loading mechanism guided along a first take-up guide groove, while FIG. 5B shows partially the take-up loading mechanism guided along a second take-up guide groove.

DETAILED DESCRIPTION OF THE PREFERRED EMBODIMENTS

Figure 1:
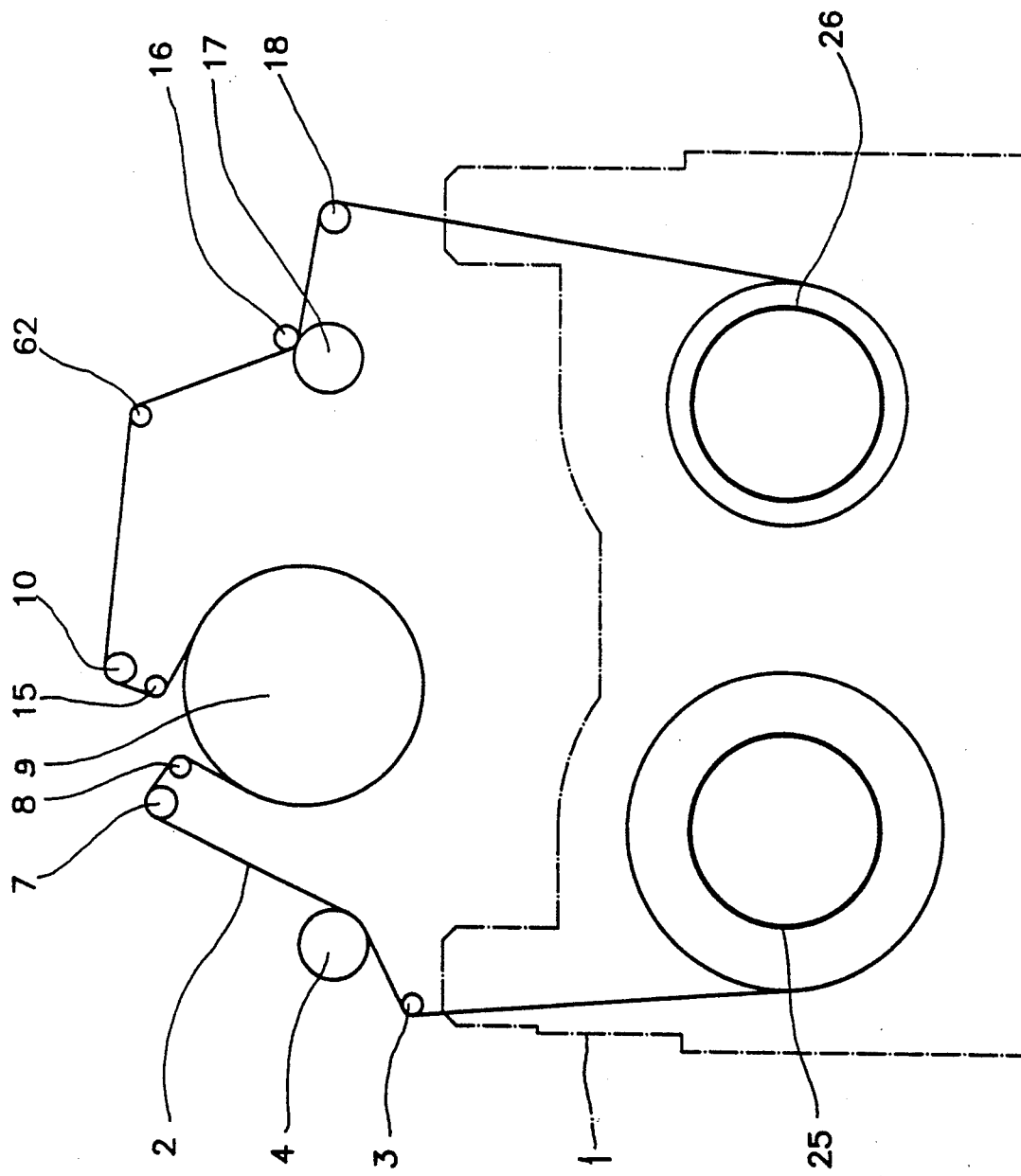
FIG. 1 is a schematic view of a tape travel system for conventional drums of VCRs.

Referring to FIGS. 2 to 5, there is shown a tape conveying device of a VCR in accordance with the present invention. The tape conveying device comprises a supply loading gear 30 and a take-up loading gear 31 rotatably mounted to rotatable shafts 46 and 45 protruded downwardly from a chassis 43 (FIG. 5) of the VCR, respectively. The supply loading gear 30 and the take-up loading gear 31 are engaged with each other.

To the supply loading gear 30, a supply loading mechanism is operatively connected, which is adapted to travel along a supply guide groove 27 formed in the chassis 43 to guide and supply the tape to a drum 9 of the VCR. The supply loading mechanism comprises a first, a second and a third supply loading levers 32a, 32b and 32c, in order to move a supply slant base 6 along the supply guide groove 27 between its unloading position and its loading position. The first supply loading lever 32a is rotatably mounted at its one end to the rotatable shaft 46 of supply loading gear 30, by means of a bushing (not shown) and provided at the other end thereof with a guide pin 49 protruded upwardly into the supply guide groove 27. At the middle portion of the first supply loading lever 32a, one end of a torsion coil spring 35 is fixedly mounted. The other end of torsion coil spring 35 is fixedly mounted to the supply loading gear 30. The first supply loading lever 32a is rotated by the torque of the torsion coil spring 35 generated in the rotation of the supply loading gear 30. The second supply loading lever 32b is pivotally mounted at one end thereof to the guide pin 49 formed on the other end of first supply loading lever 32a and provided at the other end thereof with a guide pin 50 protruded upwardly into the supply guide groove 27. On the other hand, the third supply loading lever 32c is pivotally mounted at one end thereof to the guide pin 50 formed on the other end of second supply loading lever 32b. The supply slant base 6 has at its lower surface with a guide pin protruded downwardly into the supply guide groove 27 and pivotally connected to the other end of the third supply loading lever 32c. At its upper surface, the supply slant base 6 also has a supply guide roller 7 protruded vertically and upwardly and a supply slant post 8 protruded upwardly and inclinedly with respect to the upper surface.

According to the construction of the supply loading mechanism, the supply slant base 6 can travel along the supply guide groove 27 between its tape unloading position and its tape loading position, so as to guide and supply the tape 2 to the drum 9. At this time, the tape 2 guided by the supply slant base 6 travels in parallel to the horizontal chassis surface of the chassis 43, that is horizontally, since the supply guide groove 27 is formed on the horizontal chassis surface.

On the other hand, a positioning device (not shown) which determines the position of the supply slant base 6 is disposed at the end portion of the supply guide groove 27 near the drum 9.

To the take-up loading gear 31, a take-up loading mechanism is operatively connected, which is adapted to travel along a first take-up guide groove 28 and a second take-up guide groove 29 formed in the chassis 43 to guide and take-up the tape to a drum 9 of the VCR. In similar to the supply loading mechanism, the take-up loading mechanism comprises a first, a second, a third and a fourth take-up loading levers 33a, 33b, 33c and 34, in order to move a first take-up slant base 11 and a second take-up slant base 13 along the take-up guide groove 28 and the take-up guide groove 29 between their unloading positions and their loading positions, respectively. As shown in FIG. 5A, the first take-up loading lever 33a is rotatably mounted at its one end to the rotatable shaft 45 of take-up loading gear 31 and provided at the other end thereof with a guide pin 47 protruded upwardly into the first take-up guide groove 28. At the middle portion of the first take-up loading lever 33a, one end of a torsion coil spring 36 is fixedly mounted. The other end of torsion coil spring 36 is fixedly mounted to the take-up loading gear 31. The first take-up loading lever 33 a is rotated by the torque of the torsion coil spring 36 generated in the rotation of the take-up loading gear 31. The second take-up loading lever 33b is pivotally mounted at one end thereof to the guide pin 47 formed on the other end of first take-up loading lever 33a and provided at the other end thereof with a guide pin 48 protruded upwardly into the take-up guide groove 28. On the other hand, the third take-up loading lever 33c is pivotally mounted at one end thereof to the guide pin 48 formed on the other end of second take-up loading lever 33b. To the guide pin 48 of second take-up loading lever 33b, one end of the fourth take-up loading lever 34 is also pivotally connected, as shown in FIG. 5B. On the other hand, the first take-up slant base 11 has at its lower surface with a guide pin protruded downwardly into the first take-up guide groove 28 and pivotally connected to the other end of the third take-up loading lever 33c. At its upper surface, the first take-up slant base 11 also has a first take-up guide roller 10 protruded vertically and upwardly. The second take-up slant base 13 has at its lower surface with a guide pin protruded downwardly into the second take-up guide groove 29 and pivotally connected to the other end of the fourth take-up loading lever 34. At its upper surface, the second take-up slant base 13 also has a second take-up guide roller 12 protruded upwardly and inclinedly to form a certain angle together with the upper surface.

Figure 3:
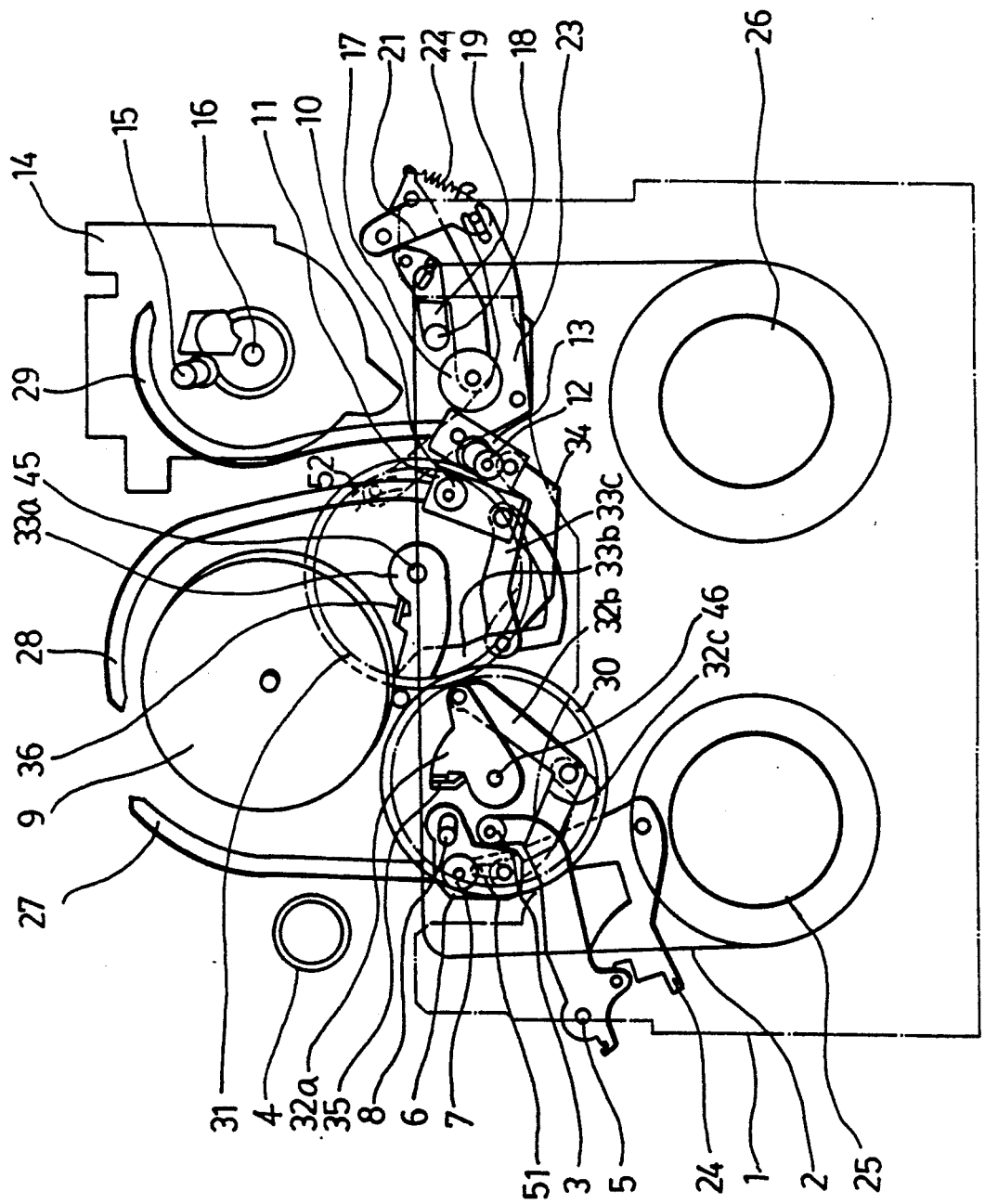
FIG. 3 is a plan view of the tape conveying device in accordance with the embodiment of the present invention, in which the tape unloading condition of the device is shown.

According to the construction of the take-up loading mechanism, the first take-up slant base 11 and the second take-up slant base 13 can travel along the first take-up guide groove 28 and the second take-up guide groove 29 between their tape unloading positions and their tape loading positions, respectively, so as to guide the tape 2 from the drum 9. As shown in FIG. 5A, the first take-up guide groove 28 has an unloading portion formed in the horizontal chassis surface of the chassis 43 and a loading portion formed in a downwardly inclined chassis surface extending from the horizontal chassis surface rearwardly of the drum 9. The loading portion of the first take-up groove 28 extends curvedly around the drum 9. Accordingly, the first take-up slant base 11 is disposed to form a certain angle with respect to the horizontal plane, at its loading position. On the other hand, the second take-up guide groove 29 is formed in the horizontal chassis surface, as shown in FIG. 5B, so that the second take-up slant base 13 travels in parallel to the horizontal plane. In particular, the end portion of the first take-up guide groove 28 corresponding to the loading position of the first take-up slant base 11 extends laterally, as shown in FIG. 3. Accordingly, the first take-up slant base 11 extends laterally at its loading position so that it occupies the space at the rear of drum 9, as small as possible. For the same purpose, the end portion of the second take-up guide groove 29 corresponding to the loading position of the second take-up slant base 13 extends laterally.

In accordance with the above-mentioned construction of take-up loading mechanism, the first take-up guide roller 10 and the second take-up guide roller 12 have the same orientation and the same slant with respect to the horizontal plane, at their loading positions.

On the other hand, a supply actuating arm 24 and a take-up actuating arm 23 are pivotally mounted to the chassis 43. The supply actuating arm 24 has one end operatively connected to a cam groove 51 formed in the lower surface of the supply loading gear 30 and the other end pivotally connected with a tension arm 5 to which the tension post member 3 is mounted. According to the rotation of the supply loading gear 30 in the tape loading operation, the supply actuating arm 24 moves the tension arm 5 to guide the tape 2 such that it contacts the impedance roller 4. On the other hand, the take-up actuating arm 23 has one end operatively connected to a cam groove 52 formed in the lower surface of the take-up loading gear 31 and the other end pivotally connected with a pinch roller pressing device. The pinch roller pressing device has a conventional construction which comprises a pinch arm 20 having a pinch roller 17, take-up arm 19 having a take-up guide member 18 and a pressing lever 21 carrying a spring 22 adapted to provide a pinch roller pressing force. According to the rotation of the take-up loading gear 31 in the loading operation, the take-up actuating arm 23 functions to press the pinch roller 17 of the pinch roller pressing device against the capstan shaft 16.

Figure 4:
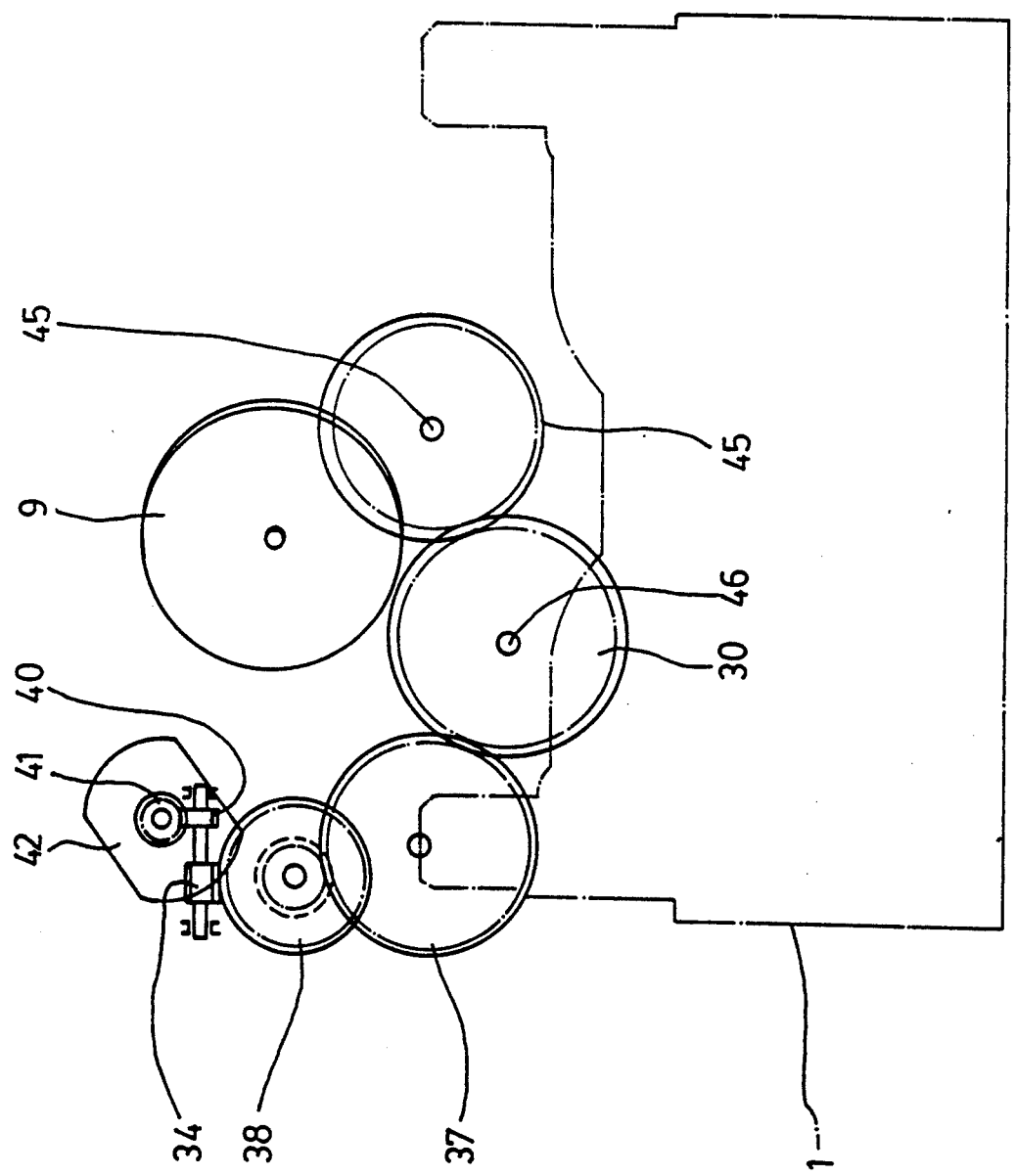
FIG. 4 is a schematic view of a power transmission system in accordance with the embodiment of the present invention.
Figure 5:
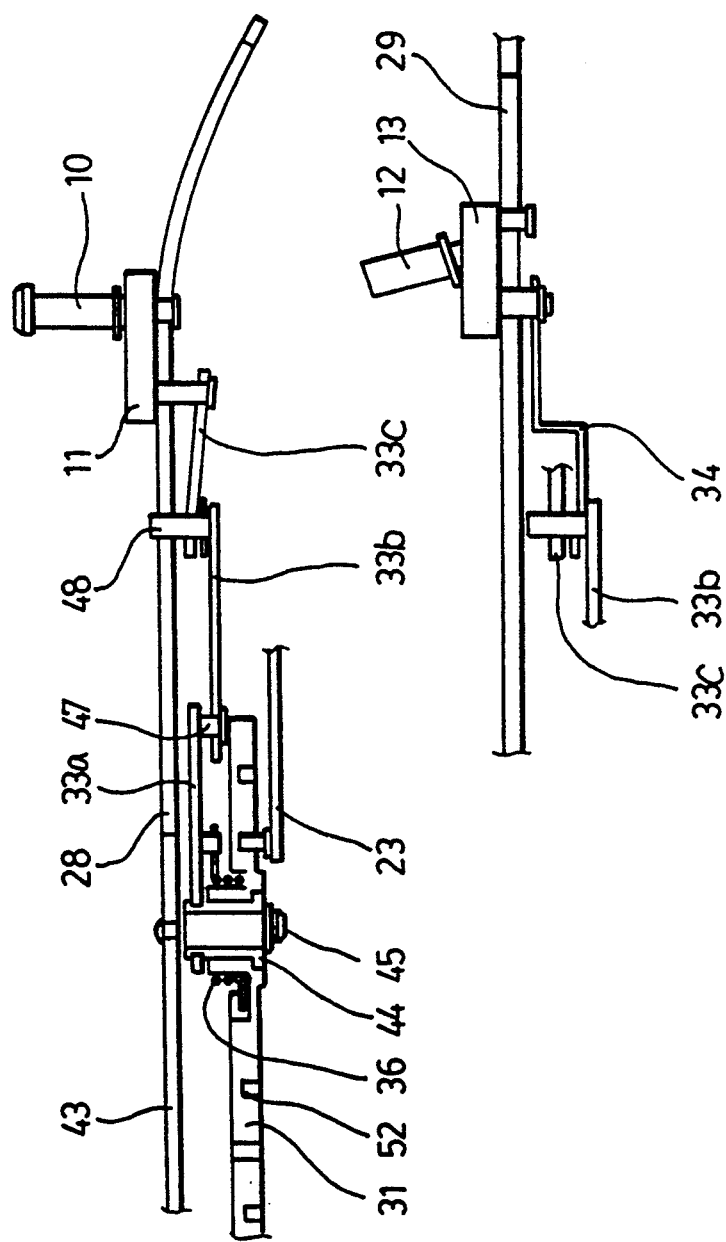

A take-up slant post 15 is protruded upwardly from the chassis 43, between the loading position of the second take-up guide roller 12 and the capstan shaft 16.

the rotation force of the supply loading gear 30 and the take-up loading gear 31 is provided by a loading motor 42. As shown in FIG. 4, the driving force of the loading motor 42 is transmitted to the supply loading gear 30, via a conventional reduction device including a first worm 41, a first worm wheel 40, a second worm 39, second worm wheel 38 and a connecting gear 37. By the rotation of the supply loading gear 30, the take-up loading gear 31 engaged therewith is also rotated.

On the other hand, positioning devices (not shown) determining positions and slants of the first take-up slant base 11 and the second take-up slant base 13 are disposed at end portions of the first take-up guide groove 28 and the second take-up guide groove 29.

Operation of the tape conveying device having the above-mentioned construction will now be described.

Figure 2:
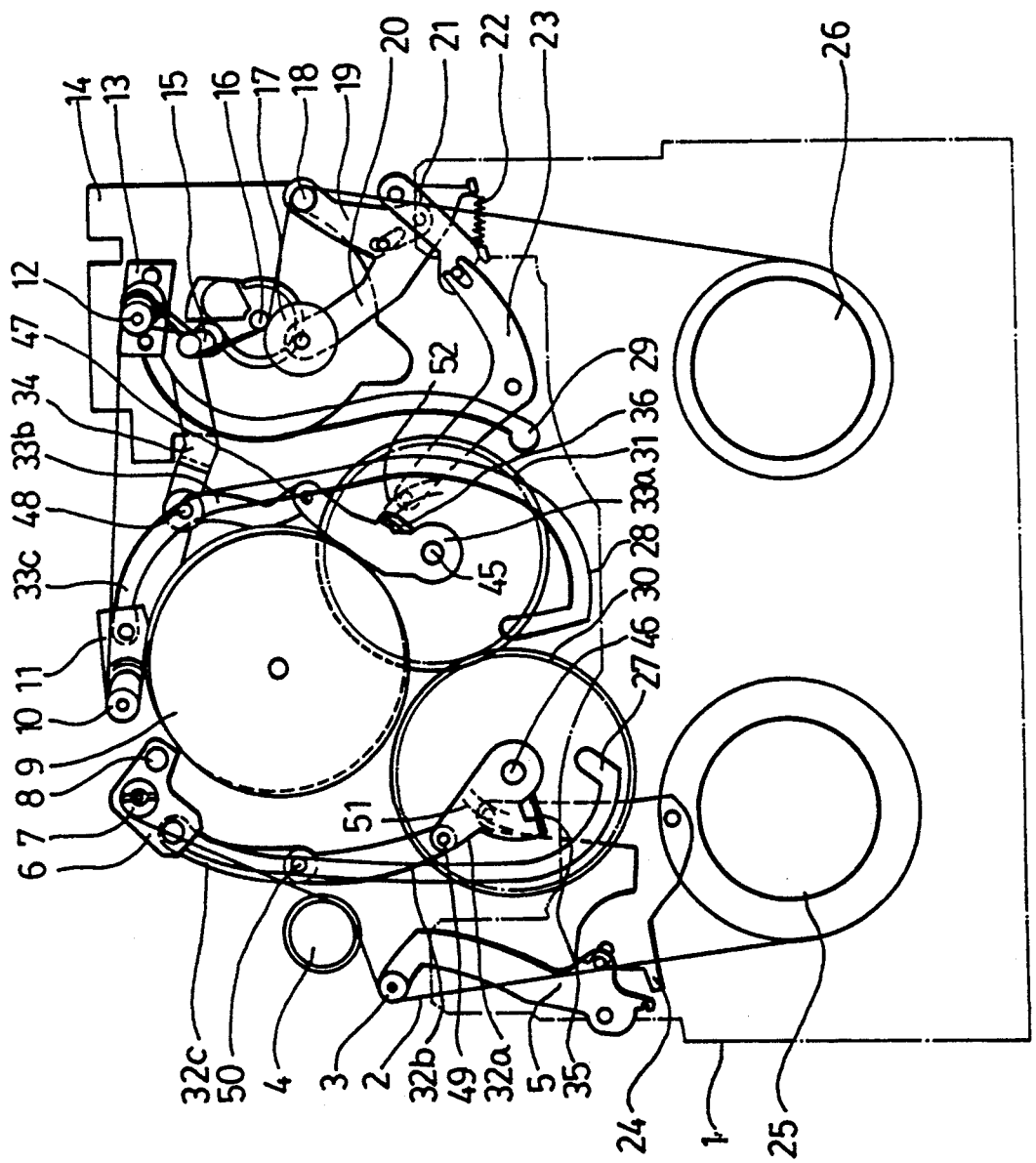
FIG. 2 is a plan view of a tape conveying device in accordance with an embodiment of the present invention, in which the tape loading condition of the device is shown.

As the tape loading operation proceeds by a normal rotation of the loading motor 42, the tape conveying device moves from the eject state, that is the tape unloading state shown in FIG. 3 to the play state, that is the tape loading state shown in FIG. 2. At this time, the driving force of the loading motor 42 is transmitted to the supply loading gear 30 and the take-up loading gear 31, via the reduction device, thereby causing the supply loading gear 30 to rotate clockwise and the take-up loading gear 31 to rotate anti-clockwise.

Accordingly, the supply slant base 6 which is connected to the supply loading mechanism comprising the first, the second and the third supply loading levers 32a, 32b and 32c moves along the supply guide groove 27 and in parallel to the horizontal plane. On the other hand, the first take-up slant base 11 which is connected to one part of the take-up loading mechanism comprising the first, the second and the third take-up loading levers 33a, 33b and 33c moves along the curved first take-up guide groove 28 to travel downwardly and inclinedly with respect to the horizontal plane. Also, the second take-up slant base 13 which is connected to the other part of take-up loading mechanism comprising the first, the second and the fourth take-up loading levers 33a, 33b and 34 moves along the second take-up guide groove 29 to travel in parallel to the horizontal plane.

As the supply slant base 6, the first take-up slant base 11 and the second take-up slant base 13 reach their tape loading positions, their position and slant are determined by positioning devices. On the other hand, slant bases 6, 11 and 13 are maintained to be pressed against respective ends of guide grooves 27, 28 and 29, by virtue of spring forces of the springs 35 and 36.

Also, the supply actuating arm 24 and the take-up actuating arm 23 which are engaged in cam grooves 51 and 52 are pivotally moved, by the rotation of the supply loading gear 30 and the take-up loading gear 31, thereby causing the tension arm 5 and the pinch roller pressing device to be actuated.

As the loading of tape is completed, the tape 2 travels from the supply reel 25 to the take-up reel 26, via the tension post member 3, the impedance roller 4, the supply guide roller 7, the supply slant post 8, the drum 9, the first take-up guide roller 10, the second take-up guide roller 12, the take-up slant post 15, the capstan shaft 16, the pinch roller 17 and the take-up guide member 18.

On the other hand, the unloading operation of the tape feeding device is carried out by moving the tape feeding device from its loading state to its unloading state, in a reverse manner to that of the loading operation.

As apparent from the above description, the present invention positively uses guide rollers, in place of slant posts. As a result, the travel load of tape is greatly reduced, so that a travelling system having the stability and reliability can be obtained. In accordance with the present invention, the tape conveying device comprises a small size of first slant base, thereby enabling the rear space of drum to be reduced. Also, the device has a second take-up groove formed in parallel to the chassis, so that it can be easily machined and manufactured. Consequently, it is possible to provide a compact, light and easily manufactured tape feeding device.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A tape conveying device of a VCR comprising:
   a supply loading gear and a take-up loading gear rotatably mounted to rotatable shafts protruded downwardly from a chassis of the VCR, so as to feed a tape of a tape cassette via drum, said gears being engaged with each other;
   a supply slant base adapted to travel along a supply guide groove formed at said chassis to guide and supply the tape to said drum and provided at its lower surface with a guide pin protruded downwardly into said supply guide groove and at its upper surface with a supply guide roller protruded vertically and upwardly and a supply slant post protruded upwardly and inclinedly with respect to said upper surface;
   a supply loading mechanism connected operatively to said supply loading gear and adapted to move said supply slant base between its tape unloading position and its tape loading position, according to the rotation of supply loading gear;

a first take-up slant base adapted to travel along a first take-up guide groove formed at said chassis to guide the tape coming out of the drum and provided at its lower surface with a guide pin protruded downwardly into said first take-up guide groove and at its upper surface with a first take-up guide roller protruded vertically and upwardly;

a second take-up slant base adapted to travel along a second take-up guide groove formed at said chassis to guide the tape passing said first take-up guide roller of first take-up slant base and provided at its lower surface with a guide pin protruded downwardly into said second take-up guide groove and at its upper surface and a supply slant post protruded upwardly and inclinedly with respect to said upper surface; and a take-up loading mechanism connected operatively to said take-up loading gear and adapted to move said first and second take-up slant bases between their tape unloading positions and their tape loading positions, according to the rotation of take-up loading gear.

2. A tape conveying device in accordance with claim 1, wherein said supply loading mechanism comprises:

a first supply loading lever rotatably mounted at one end thereof to the rotatable shaft of supply loading gear and provided at the other end thereof with a guide pin protruded upwardly into the supply guide groove, said first supply loading lever being connected at the middle portion thereof with one end of a torsion coil spring having the other end fixedly mounted to the supply loading gear so that it is rotated by the torque of said torsion coil spring generated in the rotation of the supply loading gear;

a second supply loading lever pivotally mounted at one end thereof to said guide pin formed on the other end of first supply loading lever and provided at the other end thereof with a guide pin protruded upwardly into the supply guide groove; and a third supply loading lever pivotally mounted at one end thereof to the guide pin formed on the other end of second supply loading lever and at the other end thereof to the guide pin formed on the supply slant base.

3. A tape conveying device in accordance with claim 1, wherein said take-up loading mechanism comprises:

a first take-up loading lever rotatably mounted at one end thereof to the rotatable shaft of take-up loading gear and provided at the other end thereof with a guide pin protruded upwardly into the first take-up guide groove, said first take-up loading lever being connected at the middle portion thereof with one end of a torsion coil spring having the other end fixedly mounted to the take-up loading gear so that it is rotated by the torque of said torsion coil spring generated in the rotation of the take-up loading gear;

a second take-up loading lever pivotally mounted at one end thereof to said guide pin formed on the other end of first take-up loading lever and provided at the other end thereof with a guide pin protruded upwardly into the first take-up guide groove;

a third take-up loading lever pivotally mounted at one end thereof to the guide pin formed on the other end of second take-up loading lever and at the other end thereof to the guide pin formed on the first take-up slant base; and a fourth take-up loading lever pivotally mounted at one end thereof to the guide pin formed on the other end of second take-up loading lever and at the other end thereof to the guide pin formed on the second take-up slant base.

4. A tape conveying device in accordance with claim 1, wherein said supply guide groove and said second take-up guide groove are formed in the horizontal chassis surface, while said first take-up guide groove comprises an unloading portion formed in the horizontal chassis surface and a curvedly extending loading portion formed in a downwardly inclined chassis surface extending from the horizontal chassis surface rearwardly of the drum.

5. A tape conveying device in accordance with claim 1, wherein respective end portions of said first and second take-up guide grooves corresponding to loading positions of said first and second take-up slant bases extend laterally so that the first and second take-up slant bases extend laterally at their loading positions, respectively.

6. A tape conveying device in accordance with claim 1, wherein said first and second take-up guide rollers have the same orientation and the same slant with respect to the horizontal plane, at their loading positions.

* * * * *